United States Patent [19]

Cawley et al.

[11] 4,190,199
[45] Feb. 26, 1980

[54] COMBINATION HEATING SYSTEM INCLUDING A CONVENTIONAL FURNACE, HEAT PUMP AND SOLAR ENERGY SUBSYSTEM

[75] Inventors: Richard E. Cawley, Hurst; Paul K. Buckley, Ft. Worth, both of Tex.

[73] Assignee: Lennox Industries Inc., Dallas, Tex.

[21] Appl. No.: 867,469

[22] Filed: Jan. 6, 1978

[51] Int. Cl.² ............................................. F27J 3/02
[52] U.S. Cl. .................................. 126/419; 237/2 B; 165/29; 62/160; 62/2; 126/427
[58] Field of Search ............... 237/1 A, 2 B; 126/270, 126/271, 400; 165/29, 12, 104 S; 62/2, 160

[56] References Cited

U.S. PATENT DOCUMENTS

| | | | |
|---|---|---|---|
| 3,996,759 | 12/1977 | Meckler | 237/1 A X |
| 3,996,998 | 12/1976 | Garst et al. | 165/12 |
| 4,012,920 | 3/1977 | Kirschbaum | 126/271 X |
| 4,030,312 | 6/1977 | Wallin et al. | 62/2 |
| 4,065,938 | 1/1976 | Jonsson | 165/29 X |
| 4,102,390 | 7/1978 | Harnish et al. | 165/29 |

FOREIGN PATENT DOCUMENTS 7420184  2/1976  France ........................... 237/1 A

*Primary Examiner*—Henry C. Yuen
*Assistant Examiner*—Henry A. Bennett
*Attorney, Agent, or Firm*—Allegretti, Newitt, Witcoff & McAndrews

[57] ABSTRACT

A heating system incorporating a conventional furnace, heat pump and solar energy subsystem is disclosed herein. A control unit coordinates operation of the components. In a solar assist mode, heat stored in the solar energy subsystem is transferred to the outside or evaporator coil of the heat pump to increase the efficiency thereof.

10 Claims, 4 Drawing Figures

COMBINATION HEATING SYSTEM INCLUDING A CONVENTIONAL FURNACE, HEAT PUMP AND SOLAR ENERGY SUBSYSTEM

BACKGROUND OF THE INVENTION

This invention relates generally to a heating system and more particularly to a heating system combining a furnace, heat pump and solar energy subsystem.

The present energy crisis has resulted in a massive effort to develop heating systems for homes and buildings which are more efficient than the conventional fossil fuel furnace systems. Solar energy systems, for example, have been extensively studied. Unfortunately, the equipment necessary to collect, store and transform sunlight into usable power on a continuing, large scale remains prohibitively expensive.

Another path taken in this developmental effort has been the combination of known heating elements or components. For example, U.S. Pat. No. 3,996,998 discloses a combination furnace-heat pump unit. A control mechanism coordinates operation of the furnace and heat pump.

SUMMARY OF THE INVENTION

In one principal aspect, the present invention is an air processing system including a heat pump and solar energy subsystem. Operation thereof is coordinated by a controller, responsive to conditions within the enclosure to be heated and air processing system.

Depending upon conditions, supply air delivered to the enclosure is heated by a condenser, or inside coil, of the heat pump, or a heating coil of the solar energy subsystem, or both. The heating coil is thermally interconnected to a heat storage unit.

In another aspect, the air processing system further includes a conventional furnace. The furnace is only activated when the heat pump and solar energy subsystem cannot meet the heating demand within the enclosure.

Yet another aspect of the present invention includes the solar energy subsystem operable in a solar-boost state to assist the heat pump or, more particularly, to enhance the operation thereof. In the solar-boost state, heat stored in the solar energy subsystem is transferred and passed to the evaporator, or outside coil, of the heat pump. This heat assists in evaporating the heat pump refrigerant, thereby elevating the evaporating temperature and increasing the coefficient of performance of the heat pump.

It is thus an object of the present invention to provide an improved heating system including a heat pump and solar energy subsystem. Another object is an air processing system wherein a conventional furnace is operated in coordination with a heat pump and solar energy subsystem to most efficiently maintain temperature conditions within an enclosure.

Yet another object of the present invention is a heating system wherein operation of a heat pump is enhanced by a solar energy subsystem. It is also an object to provide a heating system wherein a solar energy subsystem is utilized, under predetermined conditions, to directly heat supply air for the enclosure and, under other conditions, to assist in evaporation of the refrigerant in a heat pump.

A further object is to provide an assisted heat pump wherein the number of defrost cycles is substantially reduced. Yet another object of the present invention is to provide an improved heating system, combining a heat pump and solar energy subsystem, which is readily and inexpensively manufactured and installed.

These and other objects, features and advantages of the present invention are apparent in the following description of preferred embodiments.

BRIEF DESCRIPTION OF THE DRAWING

Preferred embodiments of the present invention are described herein with reference to the drawing wherein.

DETAILED DESCRIPTION OF A PREFERRED EMBODIMENT

Apparatus

Figures 1, 4:
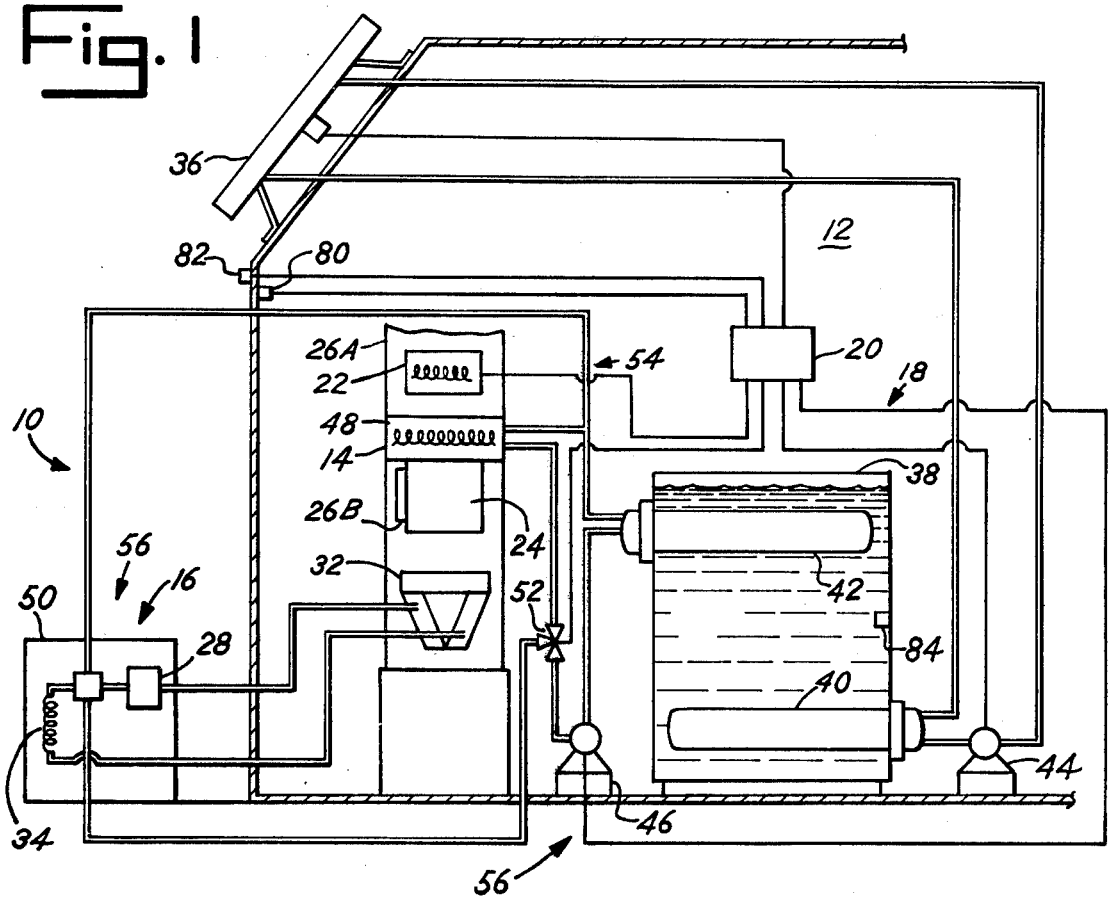
FIG. 1 is a schematic diagram of a heating system for an enclosure, incorporating a preferred embodiment of the present invention.
FIG. 4 is a block diagram illustrating alternative configurations of the solar energy subsystem shown in FIG. 1.
Figure 2:
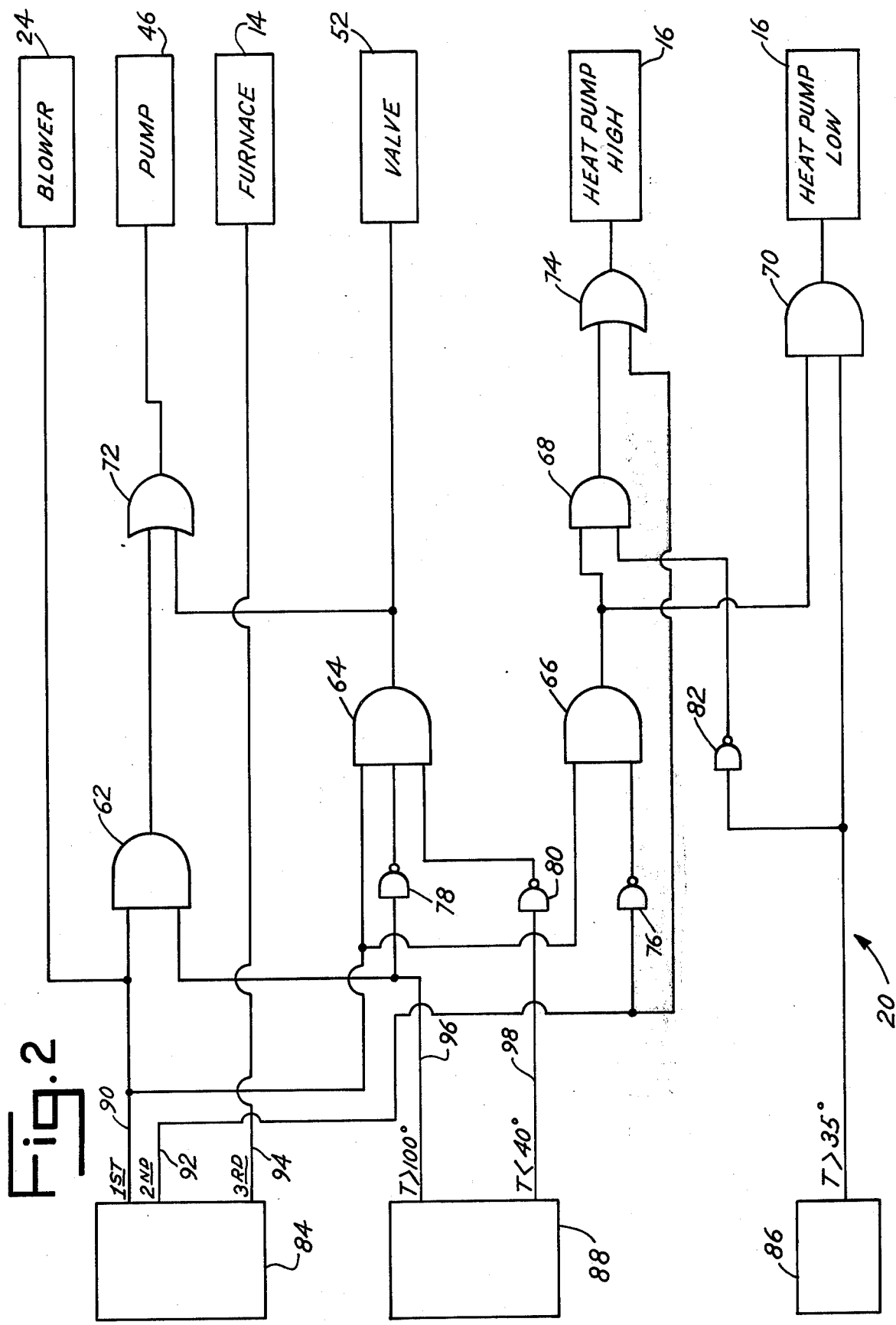
FIG. 2 is a schematic diagram of the control mechanism shown in FIG. 1.
Figure 3:
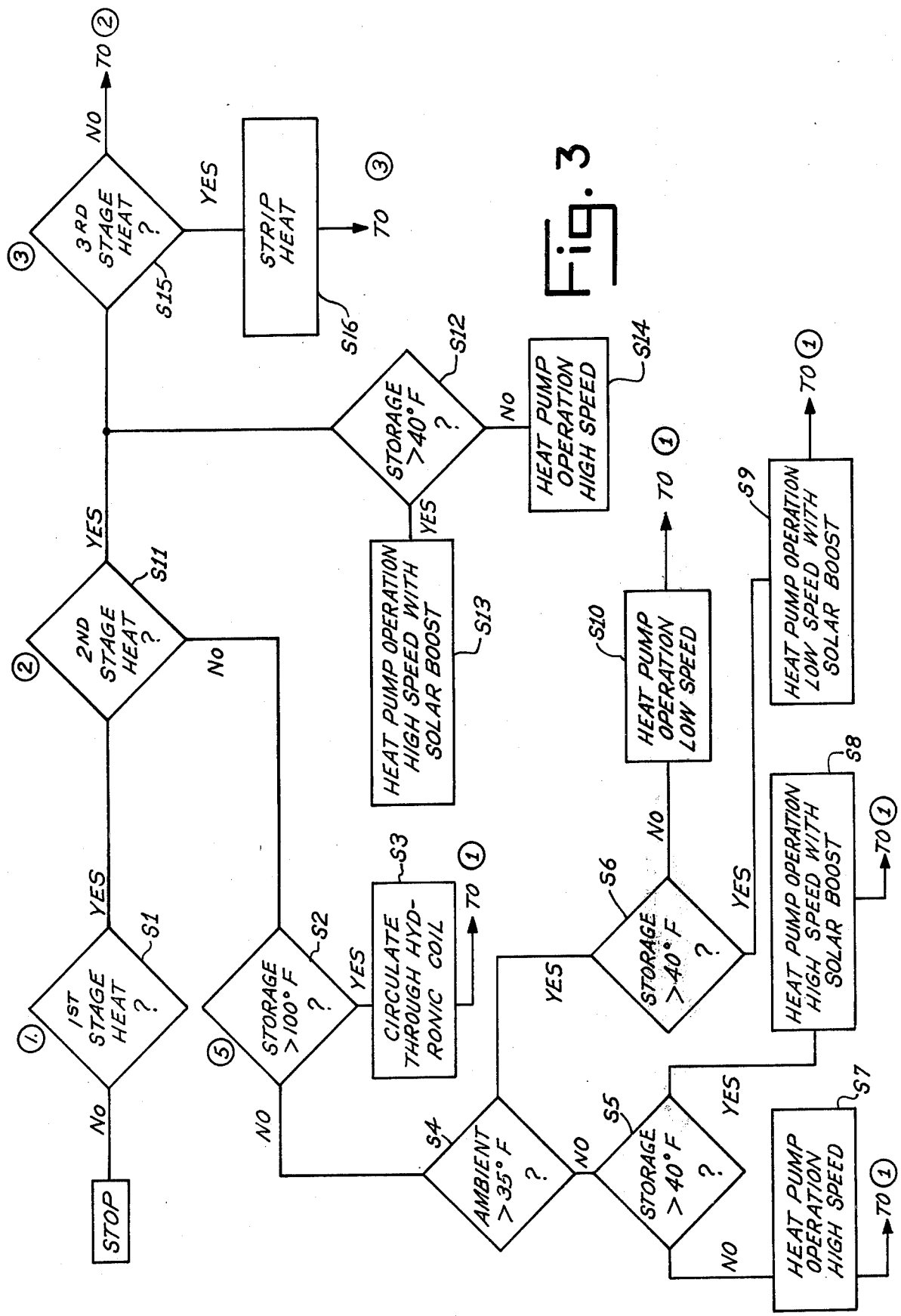
FIG. 3 is a flow chart illustrating operation of the preferred embodiment shown in FIGS. 1 and 2.

A preferred embodiment of the present invention is shown in FIGS. 1-3 as a system, generally designated 10, for processing the air in an enclosure 12. The system 10 includes a furnace 14, heat pump 16, solar energy subsystem 18 and control mechanism 20 for controlling the operation thereof. In this preferred embodiment, the furnace 14 is electric and includes a heating element 22; it is to be understood, however, that the system 10 may include any conventional furnace, such as a propane gas or oil furnace. The furnace 14 further includes a blower 24, supply air ducts 26A and return air ducts 26B.

Referring now primarily to FIG. 1, the heat pump 16 includes a compressor 28, inside coil 32 and outside coil 34. The heat pump 16 or more particularly, the compressor 28 has two speeds. For heating, the inside coil 32 operates as a condenser, dispersing heat to the return air, while the outside coil 34 operates as an evaporator, absorbing heat from the outdoor air.

A fan (not shown) provides circulation of outdoor air over the outside coil 34. In this preferred embodiment, the heat pump 16 is also operable in a cooling mode by activation of a reverse valve (not shown).

The solar energy subsystem 18 includes a solar energy collector panel 36, or series thereof, situated atop the enclosure 12, heat storage tank 38, first and second heat exchangers 40, 42, respectively, first and second pumps 44, 46, respectively, heat dispensing coil 48, heat exchanger 50 and two way valve 52, interconnected as shown. The storage tank 38 stores heat derived from solar energy collected by the solar collector panel 36. The storage medium is water.

The heat dispensing coil 48 communicates with the supply air stream, produced by the blower 24. The coil 48 is also in heat transfer relationship with the heat storage tank 38; that is, the coil 48 is thermally coupled to the heat storage tank 38 through the second heat exchanger 42, second pump 46 and two-way valve 52. As such, the exchanger 42, pump 46, coil 48 and valve 52 define means, generally designated 54, for transferring heat stored in the tank 38 to the supply air stream.

The heat exchanger 50 is also in heat transfer relationship with heat storage tank 38 through the second heat exchanger 42, second pump 46 and two-way valve 52. The heat exchanger 50 is thermally coupled to the outside coil 34 of the heat pump 16 and, in this preferred embodiment, is a water-to-refrigerant heat exchanger. The exchanger 42, pump 46 heat exchanger 50 and valve 52, in cooperation define means, generally designated 56, for transferring heat stored in the tank 38 to the outside coil 34.

The solar energy subsystem 18 defines three fluid circuits. One includes the collector panel 36, first heat exchanger 40 and first pump 44. The fluid utilized in this circuit is preferably water ethylane-glycol, an antifreeze solution.

The second circuit includes a de-energized or relaxed valve 52, which interconnects the second heat exchanger 42, second pump 46, and coil 48. The third circuit includes the second heat exchanger 42, second pump 46, water-to-refrigerant heat exchanger 50 and energized valve 52. The preferred fluid for the second and third circuits is water ethylane-glycol.

The valve 52 is controllably operated by the control mechanism 20 to selectively interconnect and thermally couple the coil 48 and heat exchanger 50 to the heat storage tank 38. In a direct heating state of the solar energy system 18, the storage tank 38 and coil 48 are connected in heat transfer relationship; the storage tank 38 and heat exchanger 50 are interconnected in heat transfer relationship in a solar-boost state.

The preferred embodiment of the solar energy subsystem 18 shown in FIG. 1 and various alternatives are shown in FIG. 4. One alternative involves substitution of an inlet-outlet port 58 for the second heat exchanger 42. The medium of the heat storage tank 38 is, in this alternative embodiment, directly pumped to heat exchange means 56.

In another embodiment, a heater coil 60 is substituted for the water-to-refrigant heat exchanger 50. The heater coil 60 is in proximity with the outside coil 34 of the heat pump 16 and thermally coupled thereto. Air circulated about the outside coil 34 is initially passed over and through the heater coil 60 and pre-heated. As this preheated air contacts the outdoor coil 34, the heat absorbed from the heater coil 60 is transferred to the outside coil 34 and refrigerant therein.

As shown in FIG. 2, the control mechanism 20 includes a series of logical AND gates 62-70, OR gates 72-74 and inverters 76-82, interconnected as shown. In this preferred embodiment, the control mechanism 20 coordinates operation of the furnace 14, heat pump 16 and solar energy subsystem 18 in response to enclosure, outdoor and storage thermostatic means 84, 86, 88, respectively.

The enclosure thermostatic means 84 senses the enclosure air temperature. The enclosure thermostatic means 84 provides three output signals on lines 90, 92, 94, respectively, indicative of three successively increasing heating demands within the enclosure 12. In this preferred embodiment, the enclosure thermostatic means 84, when set to maintain a temperature of 70° F. in the enclosure 12, produces a first, second and third output signal whenever the enclosure temperature drops below 68° F., 66° F. and 64° F., respectively. The output signals of all thermostatic means 84, 86, 88 are digital HIGH signals.

The outdoor thermostatic means 86 senses outdoor air temperature and provides a signal whenever a predetermined set point or threshold is exceeded. In this preferred embodiment, the outdoor temperature set point is 35° F.

The storage thermostatic means 88 provides two output signals on lines 96, 98, depending upon the temperature of the storage medium within the heat storage tank 38. In this preferred embodiment, the storage thermostatic means 88 produces a signal on lines 96, 98, whenever the storage medium temperature exceeds a first predetermined storage threshold and drops below a second predetermined storage threshold, respectively. In this preferred embodiment, the thresholds are 100° F. and 40° F., respectively.

Operation

As well known in the art, the control mechanism 20 activates the first pump 44 whenever the temperature differential between the solar energy collector 36 and storage tank 38 exceeds a predetermined value. Fluid is circulated between the solar energy collector 36 and first heat exchanger 40, whereby heat derived from solar energy is stored in the storage tank 38. In this preferred embodiment, the necessary temperature differential is 18° F., as determined by a differential sensor (not shown).

Referring particularly to FIGS. 2 and 3, the control mechanism 20 initiates direct heating by the solar energy subsystem 18 whenever first stage heating is requested by enclosure thermostatic means 84 and whenever the medium temperature within the storage tank 38 exceeds the first predetermined storage threshold (S1-S3). The blower 24 is activated, in all heating states, to provide necessary air movement within the system 10 and enclosure 12.

In the direct heating state, the coil means 54 is in heat transfer relationship with the storage tank 38 and transfers heat therein to the supply air stream. The valve 52 is relaxed, the second pump 46 circulates fluid between the second heat exchanger 42 and coil 48, and heating of the enclosure 12 is effected solely by stored solar energy.

If the storage medium temperature does not exceed the first predetermined storage threshold, then the control mechanism 20 activates the heat pump 16 (S2, S10). High or low speed operation of heat pump 16 is determined by outdoor air temperature, as sensed by the outdoor thermostatic means 86 (S4).

Whenever second stage heating is required, the control mechanism 20 activates the heat pump 16 at high speed (S11, S13, S14). High speed is utilized to minimize discomfort within the enclosure 12 due to temperature drop and to avoid, if possible, a third stage demand.

Depending upon conditions within the solar energy subsystem 18, the control mechanism 20 will, during operation of the heat pump 16, institute the solar-boost state (S5, S6, S12). In the solar-boost mode, the second pump 46 and valve 52 are energized, such that the heat exchanger means 56 is in heat transfer relationship with the storage tank 38. Stored solar energy is transferred to the outside coil 34 of the heat pump 16 to assist in evaporating the refrigerant therein, and the solar energy subsystem 18 thereby enhances operation of the heat pump 16. The solar-boost state is instituted whenever the storage medium temperature exceeds the second storage threshold, i.e., 40° F.

Whenever third state heating is required, the furnace 14 is activated (S15, S16). In this preferred embodiment, and under certain conditions, the furnace 14, heat pump 16 and solar energy subsystem 18 operate concurrently.

A significant advantage derived from the solar-boost mode of operation is a substantial reduction in the number of defrost cycles required by the heat pump 16. This results from the higher evaporating temperature achieved during the solar-boost mode.

Theoretical energy calculations establish that the system 10 provides substantial savings. TABLE I shows the energy savings for a home in Dallas, Tex.

Table I

| SYSTEM | Energy Consumption - Dallas, Texas (70° F. Room temperature) | |
|---|---|---|
| | ANNUAL Kw-KR HEAT | % HEAT SAVINGS |
| Conventional Resistance Heat Furnace | 18,799 | 0 |
| Conventional Furnace with Two-Speed Heat Pump | 6,837 | 63.6 |
| Present Invention | 3,786 | 79.8 |

Various preferred embodiments of the present invention are described herein. It is to be understood, however, that the true scope and spirit of the present invention are defined and limited only by the following claims.

What is claimed is:

1. A system for heating an air stream to condition an enclosure comprising, in combination:
    a heat pump having an inside coil in communication with said air stream and an outside coil;
    a solar energy subsystem operable in a direct heating state to heat said air stream, said solar energy subsystem including storage means for storing heat derived from solar energy, a solar energy collector thermally coupled to said storage means, and coil means in communication with said air stream and in heat transfer relationship with said storage means for transferring heat from said storage means to said air stream;
    enclosure thermostatic means for producing a first enclosure signal, a second enclosure signal and a third enclosure signal whenever the temperature in said enclosure drops below a first predetermined enclosure threshold, a second predetermined enclosure threshold and a third predetermined enclosure threshold, respectively;
    storage thermostatic means for producing a first storage signal whenever the temperature in said storage means drops below a first predetermined storage threshold;
    furnace means for heating said air stream; and
    control means responsive to said enclosure thermostatic means and said storage thermostatic means for coordinating operation of said heat pump, said furnace and said solar energy subsystem, said control means activating said solar energy subsystem in response to said first enclosure signal, activating said heat pump in response to said first enclosure signal and said first storage signal, activating said heat pump in response to said second enclosure signal, and activating said furnace means in response to said third enclosure signal.

2. A system as claimed in claim 1 wherein said solar energy subsystem is operable in a solar-boost state to heat said outside coil of said heat pump, said solar energy subsystem further including heat exchanger means thermally coupled to said outside coil and in heat transfer relationship with said storage means for transferring heat from said storage means to said outside coil.

3. A system as claimed in claim 2 wherein said heat exchanger means includes a water-to-refrigerant heat exchanger.

4. A system as claimed in claim 2 wherein said heat exchanger means includes a heat dispensing coil in proximity with said outside coil.

5. A system as claimed in claim 2 wherein said solar energy system includes valve means for selectively interconnecting said coil means and said heat exchanger means in heat transfer relationship to said storage means.

6. A system as claimed in claim 2 wherein said storage thermostatic means produces a second storage signal whenever the temperature in said storage means drops below a second storage threshold.

7. A system as claimed in claim 6 wherein said control means:
    activates said solar energy subsystem in said direct heating state in response to said first enclosure signal;
    activates said solar energy subsystem in said solar-boost state and said heat pump in response to said first enclosure signal and said first storage signal;
    activates said heat pump in response to said second enclosure signal; and
    activates said furnace means in response to said third enclosure signal.

8. A system as claimed in claim 7 further comprising outdoor thermostatic means for producing a first outdoor signal whenever the outdoor temperature drops below a first predetermined outdoor threshold.

9. A system as claimed in claim 8 wherein said heat pump has a low speed and a high speed.

10. A system as claimed in claim 9 wherein said control means:
    activates said solar energy subsystem in said direct heating state in response to said first enclosure signal;
    activates said solar energy subsystem in said solar-boost state and said heat pump at said low speed in response to said first enclosure signal and said first storage signal;
    activates said solar energy subsystem in said solar-boost state and said heat pump at said high speed in response to said first enclosure signal, said first storage signal and said first outdoor signal;
    activates said heat pump at said high speed in response to said second enclosure signal; p1 activates said furnace means in response to said third enclosure signal.

* * * * *